(12) United States Patent
Kim et al.

(10) Patent No.: US 11,153,020 B2
(45) Date of Patent: Oct. 19, 2021

(54) RSS SIGNAL CORRECTION METHOD

(71) Applicant: KOREA INSTITUTE OF SCIENCE AND TECHNOLOGY, Seoul (KR)

(72) Inventors: Jung Hee Kim, Seoul (KR); Doik Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/862,741

(22) Filed: Apr. 30, 2020

(65) Prior Publication Data

US 2021/0111816 A1 Apr. 15, 2021

(30) Foreign Application Priority Data

Oct. 11, 2019 (KR) ........................ 10-2019-0126106

(51) Int. Cl.
*H04B 17/318* (2015.01)
*H04B 17/336* (2015.01)
(Continued)

(52) U.S. Cl.
CPC ......... *H04B 17/318* (2015.01); *H04B 17/336* (2015.01); *H04W 4/025* (2013.01); *H04W 4/029* (2018.02); *H04W 24/10* (2013.01)

(58) Field of Classification Search
CPC ....... H04W 4/02; H04W 4/029; H04W 24/10; H04W 4/025; H04W 56/0095; H04W 56/0055; H04W 88/02; H04W 88/08; H04W 88/00; H04W 52/245; H04W 52/0245; H04W 4/023; H04W 28/04; H04W 80/00; H04W 88/18; H04W 40/38; H04B 17/318; H04B 17/336; H04B 17/309; H04B 17/20; H04B 17/373; H04B 17/391; H04B 17/27; H04L 1/00; H04L 1/003; H04L 1/20; G01S 5/021; G01S 11/06; G01S 5/00
See application file for complete search history.

(56) References Cited

U.S. PATENT DOCUMENTS 9,179,331 B2  11/2015 Shin et al.
9,977,113 B2  5/2018 Dehghanian et al.
(Continued)

FOREIGN PATENT DOCUMENTS

| KR | 10-1390722 B1 | 4/2014 |
| KR | 10-1754535 B1 | 7/2017 |
| KR | 10-2032885 B1 | 10/2019 |

OTHER PUBLICATIONS

Yongchang Hu et al., "Self-Estimation of Path-Loss Exponent in Wireless Networks and Applications", IEEE Transactions on Vehicular Technology, Nov. 2015, pp. 5091-5102, vol. 64, No. 11.
(Continued)

*Primary Examiner* — Meless N Zewdu
(74) *Attorney, Agent, or Firm* — Rabin & Berdo, P.C.

(57) ABSTRACT

The present disclosure provides an RSS (Received Signal Strength) signal correction method for performing location measurement by utilizing information among a plurality of nodes, and the RSS signal correction method estimates a variable of an RSS signal model based on at least one of location information of a fixed node, location information of an unknown node and measurement noise information of the unknown node.

7 Claims, 13 Drawing Sheets

(51) Int. Cl.
*H04W 24/10* (2009.01)
*H04W 4/029* (2018.01)
*H04W 4/02* (2018.01)

(56) References Cited

U.S. PATENT DOCUMENTS

| | | | |
|---|---|---|---|
| 2009/0231958 A1* | 9/2009 | Wei et al. | 367/118 |
| 2012/0087272 A1* | 4/2012 | Lemkin et al. | 370/252 |
| 2012/0309427 A1* | 12/2012 | Harvey et al. | 455/456.5 |
| 2013/0045750 A1* | 2/2013 | Kim et al. | 455/456.1 |
| 2014/0120931 A1* | 5/2014 | Shin et al. | H04W 72/048 |
| 2014/0169279 A1* | 6/2014 | Song et al. | H04W 72/1231 |
| 2016/0216360 A1* | 7/2016 | Georgy et al. | G01S 5/0263 |
| 2020/0408927 A1* | 12/2020 | Youssef et al. | G01S 19/48 |

OTHER PUBLICATIONS

Maissa Ben Jamâa et al., "EasyLoc: RSS-based Localization Made Easy", Procedia Computer Science, Aug. 27-29, 2012, pp. 1127-1133, vol. 10.

Sang Woo Lee et al., "Kalman Filter-Based Indoor Position Tracking with Self-Calibration for RSS Variation Mitigation", International Journal of Distributed Sensor Networks, Aug. 13, 2015, pp. 1-10, vol. 2015, No. 674635.

Jung-Hee Kim et al., "TLS based RSS calibration and WLS based localization algorithm for real-time indoor localization," Korean Society of Mechanical Engineers Conference, May 2018, pp. 34-35.

* cited by examiner

RSS SIGNAL CORRECTION METHOD

CROSS-REFERENCE TO RELATED APPLICATION

This application claims priority to Korean Patent Application No. 10-2019-0126106, filed on Oct. 11, 2019, and all the benefits accruing therefrom under 35 U.S.C. § 119, the contents of which in its entirety are herein incorporated by reference.

BACKGROUND

1. Field

The present disclosure relates to a signal correction method, and more particularly, to a signal correction method for correcting an RSS (Received Signal Strength) model applicable to an environment that requires movement of nodes.

2. Description of the Related Art

The location recognition technology in a sensor network environment is a technique for estimating a relative location using information such as a distance or an angle from a location that is already known, and calculating locations of nodes by using the relative location.

As a general method for measuring a location in the sensor network environment, various techniques using infrared, ultrasound, RFID, UWB, RSSI, camera sensor and light are used.

Among the various techniques described above, a location measurement technique using RSSI (Received Signal Strength Indication) of a sensor node is not easily used directly because the RSSI varies greatly depending on the characteristics of the surrounding environment. Many studies are being conducted to measure a distance using irregular RSSI values.

Patent Literature 1 discloses an RSSI signal correction system and method for BLE (Bluetooth Low Energy)-based location measurement by measuring an RSSI value of a beacon signal and correcting the measured RSSI value to reduce noise of a wireless signal.

In order to detect a location of a node, techniques such as event detection, location awareness dependent computing, and geographic tracking are required. Although many studies are being conducted on reliability and data robustness in the point of view of the sensor network, there is a need for a method to secure the confidence of a received signal in location recognition.

In relation to the conventional distance model estimation, since only information between anchor nodes is used, there is a problem in that the performance of localization is deteriorated at a position of an actual unknown node rather than the anchor node.

In addition, in case of the error variable model that estimates a path loss exponent (PLE) among variables of the RSS signal model by using an error variable (EIV, Errors-in-Variables) model, only uncertainty may be modeled, the estimation accuracy of the variable is low, and only the PLE may be estimated. Thus, there is a problem that the transmit power cannot be estimated.

Meanwhile, in the conventional signal correction method, since the PLE and the transmission power are estimated in two stages, the accuracy of the transmission power estimated at the second stage depends on the estimation accuracy of the PLE estimated at the first stage.

SUMMARY

The present disclosure is directed to providing a signal correction method, which may utilize information between all nodes other than an anchor node to model information including all of certainty information and uncertainty information generated therefrom.

The present disclosure is also directed to providing a signal correction method, which may simultaneously estimate PLE and transmission power, which are variables of the RSS signal model.

In one aspect, there is provided an RSS (Received Signal Strength) signal correction method for performing location measurement by utilizing information among a plurality of nodes, the RSS signal correction method comprising: estimating a variable of an RSS signal model based on at least one of location information of a fixed node, location information of an unknown node and measurement noise information of the unknown node.

According to an embodiment of the present disclosure, the method further comprises: deriving the RSS signal model based on at least one of the location information of the fixed node, the location information of the unknown node and the measurement noise information of the unknown node; vectorizing the derived RSS signal model; and calculating an RSS signal model parameter by deriving a Partial EIV (Errors-in-Variables) model from the vectorized RSS signal model, wherein the parameter may include a path loss at a reference distance and a path loss exponent that is a ratio of an RSS signal reduced as a distance between nodes increases.

The deriving the RSS signal model may include: deriving an RSS signal model between fixed nodes, implemented by [Equation 1]; and deriving an RSS signal model between nodes including an unknown node, implemented by [Equation 2].

$$p_{ij} = P_0 - 10\gamma \log_{10}(d_{ij}/d_0) + \chi_{ij} \qquad \text{[Equation 1]}$$

Here, $p_{ij}$ is an RSS signal between $i^{th}$ and $j^{th}$ fixed nodes among the fixed nodes, $P_0$ is a path loss at a distance $d_0$, $\gamma$ is a path loss exponent, which means a ratio of $p_{ij}$ reduced as a distance $d_{ij}$ increases, $d_{ij}$ is a distance between the $i^{th}$ and $j^{th}$ nodes, $d_0$ is a reference distance, which may be 1 m, and $\chi_{ij}$ is a measurement noise of the RSS signal between the $i^{th}$ and $j^{th}$ nodes.

$$p_{ij} = P_0 - 10\gamma \log_{10}((\hat{d}_{ij} + \varepsilon_{ij})/d_0) + \chi_{ij} \qquad \text{[Equation 2]}$$

Here, $p_{ij}$ is an RSS signal between the $i^{th}$ and $j^{th}$ nodes, $P_0$ is a path loss at the distance $d_0$, $\gamma$ is a path loss exponent, which means a ratio of $p_{ij}$ reduced as a distance $\hat{d}_{ij}$ increases, $\hat{d}_{ij}$ is an estimated distance between the $i^{th}$ and $j^{th}$ nodes, $d_0$ is a reference distance, which may be 1 m, $\varepsilon$ is a distance error between the $i^{th}$ and $j^{th}$ nodes, and $\chi_{ij}$ is a measurement noise of the RSS signal between the $i^{th}$ and $j^{th}$ nodes.

In the deriving an RSS signal model between nodes including an unknown node, the [Equation 2] may be transformed to [Equation 3] by Taylor series approximation.

$$p_{ij} = P_0 - 10\gamma \log_{10}\left(\frac{\hat{d}_{ij}}{d_0}\right) - \gamma \epsilon_{ij} + \chi_{ij} \qquad \text{[Equation 3]}$$

Here, $p_{ij}$ is an RSS signal between the $i^{th}$ and $j^{th}$ nodes, $P_0$ is a path loss at the distance $d_0$, $\gamma$ is a path loss exponent, which means a ratio of $p_{ij}$ reduced as a distance d increases, is an estimated distance between the $i^{th}$ and $j^{th}$ nodes, do is a reference distance, which may be 1 m, is a distance error between the $i^{th}$ and $j^{th}$ nodes, and $\chi_{ij}$ is a measurement noise of the RSS signal between the $i^{th}$ and $j^{th}$ nodes.

Preferably, the vectorizing may be performed by [Equation 4].

$$\begin{bmatrix} p_T \\ p_F \end{bmatrix} = \left( \begin{bmatrix} 1_{vec} & d_T \\ 1_{vec} & \hat{d}_F \end{bmatrix} - \begin{bmatrix} 0_{vec} & 0_{vec} \\ 0_{vec} & \epsilon_F \end{bmatrix} \right) x + \begin{bmatrix} \chi_T \\ \chi_F \end{bmatrix}$$ [Equation 4]

Here, $x=[P_0, \gamma]T$, $P_T$ is a row vector made by an RSS signal model between fixed nodes calculable by [Equation 1], $P_F$ is a row vector made by an RSS signal model between nodes including an unknown node calculable by [Equation 2], $p_T$, $\chi_T$, and dr are values related to the RSS signal model between the fixed nodes, which are row vectors respectively having $p_{ij}$, $\chi_{ij}$ and $-10 \log_{10}(d_{ij}/d_0)$ as at least one matrix element, and $\epsilon_F$, $p_F$, $\chi_F$ and $\hat{d}_F$ are values related to the RSS signal model between the nodes including an unknown node, which are row vectors respectively having $\epsilon_{ij}$, $p_{ij}$, $\chi_{ij}$ and $-10 \log_{10}(\hat{d}_{ij}/d_0)$ as at least one matrix element:

$$p_T = \begin{bmatrix} \vdots \\ p_{ij} \\ \vdots \end{bmatrix}, \chi_T = \begin{bmatrix} \vdots \\ \chi_{ij} \\ \vdots \end{bmatrix}, \epsilon_F = \begin{bmatrix} \vdots \\ \epsilon_{ij} \\ \vdots \end{bmatrix}, p_F = \begin{bmatrix} \vdots \\ p_{ij} \\ \vdots \end{bmatrix},$$

$$\chi_F = \begin{bmatrix} \vdots \\ \chi_{ij} \\ \vdots \end{bmatrix}, d_T = \begin{bmatrix} \vdots \\ -10\log_{10}\left(\frac{d_{ij}}{d_0}\right) \\ \vdots \end{bmatrix},$$

$$\hat{d}_F = \begin{bmatrix} \vdots \\ -10\log_{10}\left(\frac{\hat{d}_{ij}}{d_0}\right) \\ \vdots \end{bmatrix}$$

where $\theta_{vec}$ is a row vector in which all elements are 0, and $1_{vec}$ is a row vector in which all elements are 1.

The calculating an RSS signal model parameter by deriving a Partial EIV model from the vectorized RSS signal model may be performed by [Equation 5] and [Equation 6].

$$p - \chi = (x^T \otimes I)(d_{T,aug} + I_{aug}d_F)$$ [Equation 5]

Here, $p = [p_T^T \ p_F^T]^T$, $\chi = [\chi_T^T \ \chi_F^T]^T$, $$d_{T,aug} = \begin{bmatrix} 1_{vec} \\ 1_{vec} \\ d_T \\ 0_{vec} \end{bmatrix}, I_{aug} = \begin{bmatrix} 0_{mat} \\ 0_{mat} \\ 0_{mat} \\ I \end{bmatrix},$$

$\theta_{vec}$ is a row vector in which all elements are 0, $1_{vec}$ is a row vector in which all elements are 1, $\theta_{mat}$ is a row vector in which all elements are 0, and $d_F$ is an actual distance value obtained by subtracting the distance error from a $\hat{d}F$ that is a value based on the estimated distance.

$$\hat{d}_F = d_F + \epsilon_F$$ [Equation 6]

Here, $\hat{d}_F$ is a row vector in which $\hat{d}_{ij}$ that is an estimated distance between the $i^{th}$ and $j^{th}$ nodes is a matrix element, CF is a row vector in which a distance error $\epsilon_{ij}$ between the $i^{th}$ and $j^{th}$ nodes is a matrix element, and $\hat{d}_F$ is an actual distance value obtained by subtracting the distance error from d F that is a value based on the estimated distance.

The RSS signal correction method of the present disclosure may, before the deriving an RSS signal model, further comprise: inputting an initial path loss and an initial path loss exponent; and estimating a location of an unknown node based on a path loss and a path loss exponent before the initial path loss and the initial path loss exponent, wherein the deriving an RSS signal model, the vectorizing the derived RSS signal model and the calculating an RSS signal model parameter may be performed based on the initial path loss, the initial path loss exponent and the previous location of the unknown node.

The estimating a location of an unknown node, the deriving an RSS signal model, the vectorizing the derived RSS signal model and the calculating an RSS signal model parameter may be performed iteratively to improve accuracy in estimating a variable of the RSS signal model.

DETAILED DESCRIPTION

Hereinafter, the embodiments disclosed in this specification will be described in detail. Here, identical or similar components are denoted by identical or similar reference symbols and not described in detail again. In the following description, the word "unit" used in terms is selected or endowed only in consideration of ease naming and does not have any distinguishable meaning or role. In addition, in the following description of the embodiments of the present disclosure, any detailed description of related arts can be omitted if it is determined that the gist of the embodiments disclosed herein can be obscured by the same. Moreover, it should be understood that the accompanying drawings are just for better understanding of the embodiments disclosed herein and are not to be construed as limiting the scope of the present disclosure. The scope of the present disclosure should be understood as including all changes, equivalents and alternatives thereof.

Terms having an ordinal such as "first" and "second" can be used for explaining various components, but the components are not limited by the terms. These terms are just used for distinguishing any component from another.

In case it is mentioned that any component is "connected" to another component, the component may be connected directly to another component, but it should be understood that any other component can be further interposed between them.

The singular expressions are intended to include the plural forms as well, unless the context clearly indicates otherwise.

In this specification, the term such as "include" and "have" is just to specify the presence of features, integers, steps, operations, elements, parts or components thereof, stated in the specification, but does not preclude the presence or addition of one or more other features, integers, steps, operations, elements, parts or components thereof.

Figure 1:
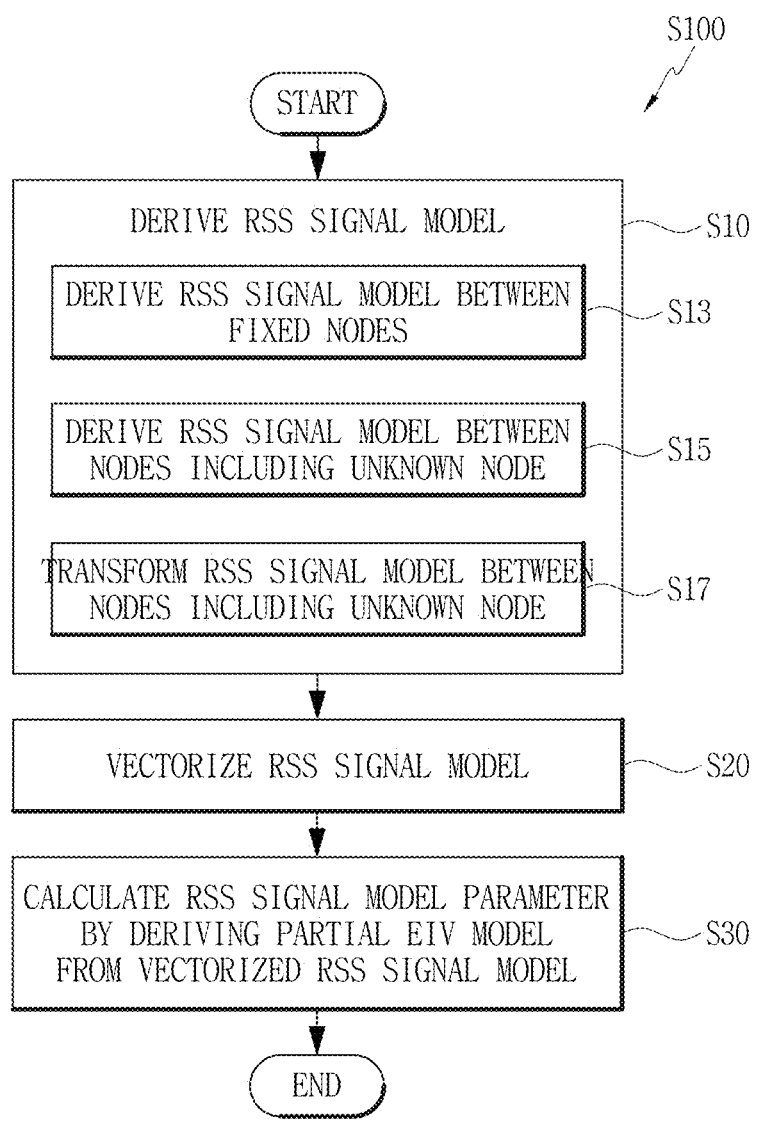
FIG. 1 is a flowchart for illustrating an example of an RSS signal correction method of the present disclosure.
Figure 2:
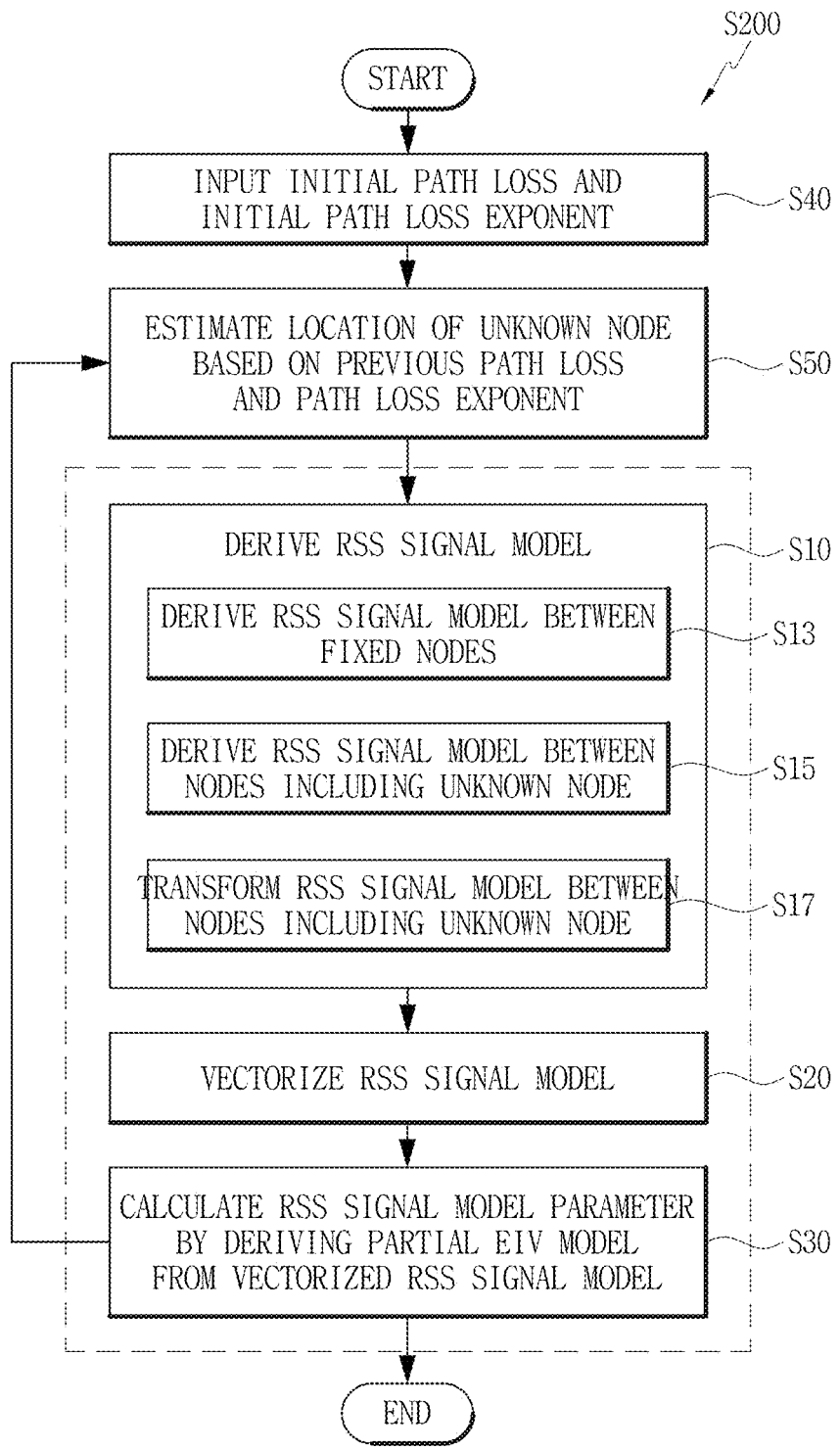
FIG. 2 is a flowchart for illustrating another example of the RSS signal correction method of the present disclosure.

FIG. 1 is a flowchart for illustrating an example of an RSS signal correction method (S100) of the present disclosure, and FIG. 2 is a flowchart for illustrating another example of the RSS signal correction method (S200) of the present disclosure. Referring to FIGS. 1 and 2, the RSS signal correction method of the present disclosure will be described.

The RSS (Received Signal Strength) signal correction method of the present disclosure is a method for performing location measurement by utilizing information between a plurality of nodes. In addition, the RSS signal correction method of the present disclosure estimates a variable of an RSS signal model based on at least one of location information of a fixed node, location information of an unknown node and measurement noise information of the unknown node.

In the present disclosure, the location of the fixed node is fixed so that the location information of the fixed node may be known and be derived as a coordinate value. In an example, the fixed node may be an anchor node.

In addition, in the present disclosure, the location of the unknown node is not fixed, and thus the exact location information of the unknown node is not known and is difficult to be derived as a coordinate value.

Referring to FIG. 1, the RSS signal correction method (S100) of the present disclosure may include deriving an RSS signal model based on at least one of location information of a fixed node, location information of an unknown node and measurement noise information of the unknown node (S10), vectorizing the derived RSS signal model (S20), and calculating an RSS signal model parameter by deriving a Partial EIV model from the vectorized RSS signal model (S30). In the present disclosure, the RSS signal model parameter may include a path loss at a reference distance and a path loss exponent that is a ratio of the RSS signal reduced as the distance between nodes increases. The path loss may be $P_0$, and the path loss exponent may be $\gamma$.

The deriving an RSS signal model (S10) may include deriving an RSS signal model between fixed nodes (S13) and deriving an RSS signal model between nodes including an unknown node (S15).

The deriving an RSS signal model between fixed nodes (S13) may derive the RSS signal model based on a distance between the fixed nodes and measurement noise between the fixed nodes.

In addition, the RSS signal model between the fixed nodes may be derived using [Equation 1]. [Equation 1] is $p_{ij}=P_0-10\gamma \log_{10}(d_{ij}/d_0)+\chi_{ij}$.

In [Equation 1], $p_{ij}$ is an RSS signal between $i^{th}$ and $j^{th}$ fixed nodes, $P_0$ is a path loss at a distance $d_0$, $\gamma$ is a path loss exponent, which means a ratio of $p_{ij}$ reduced as a distance $d_{ij}$ increases, $d_{ij}$ is a distance between the $i^{th}$ and $j^{th}$ nodes, $d_0$ is a reference distance, which may be 1 m, and $\chi_{ij}$ is a measurement noise of the RSS signal between the $i^{th}$ and $j^{th}$ nodes. In [Equation 1], the $i^{th}$ and $j^{th}$ fixed nodes mean any fixed nodes among a plurality of fixed nodes.

The deriving an RSS signal model between nodes including an unknown node (S15) may derive the RSS signal model based on a distance between the nodes including an unknown node and measurement noise between the nodes including an unknown node.

The distance between the nodes including an unknown node may include a distance between an unknown node and a node and a distance between an unknown node and an unknown node. In addition, the measurement noise between the nodes including an unknown node may include measurement noise between an unknown node and a node and measurement noise between an unknown node and an unknown node.

The RSS signal model between the nodes including an unknown node may be derived using [Equation 2]. [Equation 2] is $p_{ij}=P_0-10\gamma \log_{10}((\hat{d}_{ij}+\varepsilon_{ij})/d_0)+\chi_{ij}$.

In [Equation 2], $p_{ij}$ is an RSS signal between the $i^{th}$ and $j^{th}$ nodes, $P_0$ is a path loss at the distance $d_0$, $\gamma$ is a path loss exponent, which means a ratio of $p_{ij}$ reduced as a distance $\hat{d}_{ij}$ increases, $\hat{d}_{ij}$ is an estimated distance between the $i^{th}$ and $j^{th}$ nodes, $d_0$ is a reference distance, which may be 1 m, $\varepsilon_{ij}$ is a distance error between the $i^{th}$ and $j^{th}$ nodes, and $\chi_{ij}$ is a measurement noise of the RSS signal between the $i^{th}$ and $j^{th}$ nodes. In [Equation 2], the $i^{th}$ and $j^{th}$ nodes means any nodes in which at least one of the $i^{th}$ and $j^{th}$ nodes is an unknown node, among a plurality of nodes including an unknown node.

If both the i and j values are fixed nodes, it may be understood that [Equation 1] is applied, and if at least one of the i and j values is an unknown node, it may be understood that [Equation 2] is applied.

Meanwhile, the RSS signal model between the nodes including an unknown node derived through [Equation 2] may be transformed into [Equation 3] by Taylor series approximation (S17).

$$p_{ij} = P_0 - 10\gamma \log_{10}\left(\frac{\hat{d}_{ij}}{d_0}\right) - \gamma\epsilon_{ij} + \chi_{ij} \qquad \text{[Equation 3]}$$

Here, $p_{ij}$ is an RSS signal between the $i^{th}$ and $j^{th}$ nodes, $P_0$ is a path loss at the distance $d_0$, $\gamma$ is a path loss exponent, which means a ratio of $p_{ij}$ reduced as a distance $\hat{d}_{ij}$ increases, $\hat{d}_{ij}$ is an estimated distance between the $i^{th}$ and $j^{th}$ nodes, $d_0$ is a reference distance, which may be 1 m, $\varepsilon_{ij}$ is a distance error between the $i^{th}$ and $j^{th}$ nodes, and $\chi_{ij}$ is a measurement noise of the RSS signal between the $i^{th}$ and $j^{th}$ nodes.

As an example, [Equation 2] may be transformed to [Equation 3] using the Taylor series approximation (a linearization process) as follows.

$$p_{ij} = P_0 - 10\gamma \log_{10}((\hat{d}_{ij} + \varepsilon_{ij})/d_0) + \chi_{ij} \quad \text{[Equation 2]}$$

[Taylor series approximation]

$$\log_{10}\left(\frac{\hat{d}_{ij} + \varepsilon_{ij}}{d_0}\right) =$$

$$\log_{10}\left(\frac{\hat{d}_{ij}}{d_0}\right) + \log_{10}\left(1 + \frac{\varepsilon_{ij}}{\hat{d}_{ij}}\right) \approx \log_{10}\left(\frac{\hat{d}_{ij}}{d_0}\right) + \frac{\varepsilon_{ij}}{\ln(10)\hat{d}_{ij}}$$

$$p_{ij} = P_0 - 10\gamma \log_{10}\left(\frac{\hat{d}_{ij}}{d_0}\right) - \gamma \varepsilon_{ij} + \chi_{ij} \quad \text{[Equation 3]}$$

The vectorizing the RSS signal model (S20) is performed so that the RSS signal model calculated by [Equation 1], [Equation 2] or [Equation 3] is vectorized by [Equation 4].

$$\begin{bmatrix} p_\mathcal{T} \\ p_\mathcal{F} \end{bmatrix} = \left( \begin{bmatrix} 1_{vec} & d_\mathcal{T} \\ 1_{vec} & \hat{d}_\mathcal{F} \end{bmatrix} - \begin{bmatrix} 0_{vec} & 0_{vec} \\ 0_{vec} & \epsilon_\mathcal{F} \end{bmatrix} \right) x + \begin{bmatrix} \chi_\mathcal{T} \\ \chi_\mathcal{F} \end{bmatrix} \quad \text{[Equation 4]}$$

In [Equation 4], $x = [P_0, \gamma]^T$, $P_T$ is a row vector made by an RSS signal model between fixed nodes calculable by [Equation 1], $P_F$ is a row vector made by an RSS signal model between nodes including an unknown node calculable by [Equation 2], $p_T$, $\chi_T$, and $d_T$ are values related to the RSS signal model between the fixed nodes, which are row vectors respectively having $p_{ij}$, $\chi_{ij}$ and $-10\log_{10}(d_{ij}/d_0)$ as at least one matrix element, and $\varepsilon_F$, $p_F$, $\chi_F$ and $d_F$ are values related to the RSS signal model between the nodes including an unknown node, which are row vectors respectively having $\varepsilon_{ij}$, $p_{ij}$, $\chi_{ij}$ and $-10\log_{10}((\hat{d}_{ij}/d_0)$ as at least one matrix element:

$$p_\mathcal{T} = \begin{bmatrix} \vdots \\ p_{ij} \\ \vdots \end{bmatrix}, \chi_\mathcal{T} = \begin{bmatrix} \vdots \\ \chi_{ij} \\ \vdots \end{bmatrix}, \epsilon_\mathcal{F} = \begin{bmatrix} \vdots \\ \epsilon_{ij} \\ \vdots \end{bmatrix}, p_\mathcal{F} = \begin{bmatrix} \vdots \\ p_{ij} \\ \vdots \end{bmatrix},$$

$$\chi_\mathcal{F} = \begin{bmatrix} \vdots \\ \chi_{ij} \\ \vdots \end{bmatrix}, d_\mathcal{T} = \begin{bmatrix} \vdots \\ -10\log_{10}\left(\frac{d_{ij}}{d_0}\right) \\ \vdots \end{bmatrix},$$

$$\hat{d}_\mathcal{F} = \begin{bmatrix} \vdots \\ -10\log_{10}\left(\frac{\hat{d}_{ij}}{d_0}\right) \\ \vdots \end{bmatrix}$$

where $0_{vec}$ is a row vector in which all elements are 0, and $1_{vec}$ is a row vector in which all elements are 1.

The vectorized [Equation 4] obtains an x value through partial EIV (Errors-in-Variables) modeling, and the partial EIV modeling includes [Equation 5] and [Equation 6]. The x value may be a matrix value including the path loss (for example, $P_0$) and the path loss exponent (for example, $\gamma$).

[Equation 5] is $$p - \chi = (x^T \otimes I)(d_{\mathcal{T},\text{aug}} + I_{\text{aug}} d_\mathcal{F}).$$

In [Equation 5], $$p = [p_\mathcal{T}^T \ p_\mathcal{F}^T]^T, \chi = [\chi_\mathcal{T}^T \ \chi_\mathcal{F}^T]^T,$$

$$d_{\mathcal{T},\text{aug}} = \begin{bmatrix} 1_{vec} \\ 1_{vec} \\ d_\mathcal{T} \\ 0_{vec} \end{bmatrix}, I_{\text{aug}} = \begin{bmatrix} 0_{mat} \\ 0_{mat} \\ 0_{mat} \\ I \end{bmatrix},$$

$0_{vec}$ is a row vector in which all elements are 0, $1_{vec}$ is a row vector in which all elements are 1, $0_{mat}$ is a row vector in which all elements are 0, and $d_F$ is an actual distance value obtained by subtracting the distance error from $\hat{d}_F$ that is a value based on the estimated distance.

For example, in case of a matrix vector in which x has a size of n, $$x^T \otimes I = [x(1)I \ \ldots \ x(n)I],$$

$$x(i)I = \begin{bmatrix} x(i) & & & \\ & x(i) & & 0 \\ & & \ddots & \\ & 0 & & x(i) \\ & & & & x(i) \end{bmatrix}, \text{ and,}$$

if $x = [P_0, \gamma]^T$, $$x^T \otimes I = [P_0 I \ \gamma I].$$

[Equation 6] is $\hat{d}_\mathcal{F} = d_\mathcal{F} + \epsilon_\mathcal{F}$. In [Equation 6], d F is a row vector in which that is an estimated distance between the $i^{th}$ and $j^{th}$ nodes is a matrix element, $\varepsilon_F$ is a row vector in which a distance error $\varepsilon_{ij}$ between the $i^{th}$ and $j^{th}$ nodes is a matrix element, and $d_F$ is an actual distance value obtained by subtracting the distance error from $\hat{d}_F$ that is a value based on the estimated distance.

Referring to FIG. 2, the RSS signal correction method (S200) of the present disclosure may further include inputting an initial path loss and an initial path loss exponent (S40) and estimating a location of the unknown node based on the path loss and the path loss exponent before the initial path loss and the initial path loss exponent (S50).

The inputting an initial path loss and an initial path loss exponent (S40) is performed before the deriving an RSS signal model (S10).

In addition, the deriving an RSS signal model (S10), the vectorizing the derived RSS signal model (S20) and the calculating an RSS signal model parameter (S30) are performed based on the initial path loss, the initial path loss exponent and the previous location of the unknown node.

The estimating a position of the unknown node (S50), the deriving an RSS signal model (S10), the vectorizing the derived RSS signal model (S20) and the calculating an RSS signal model parameter (S30) may be performed iteratively.

By doing so, the accuracy in estimating a variable of the RSS signal model is improved.

Figure 3:
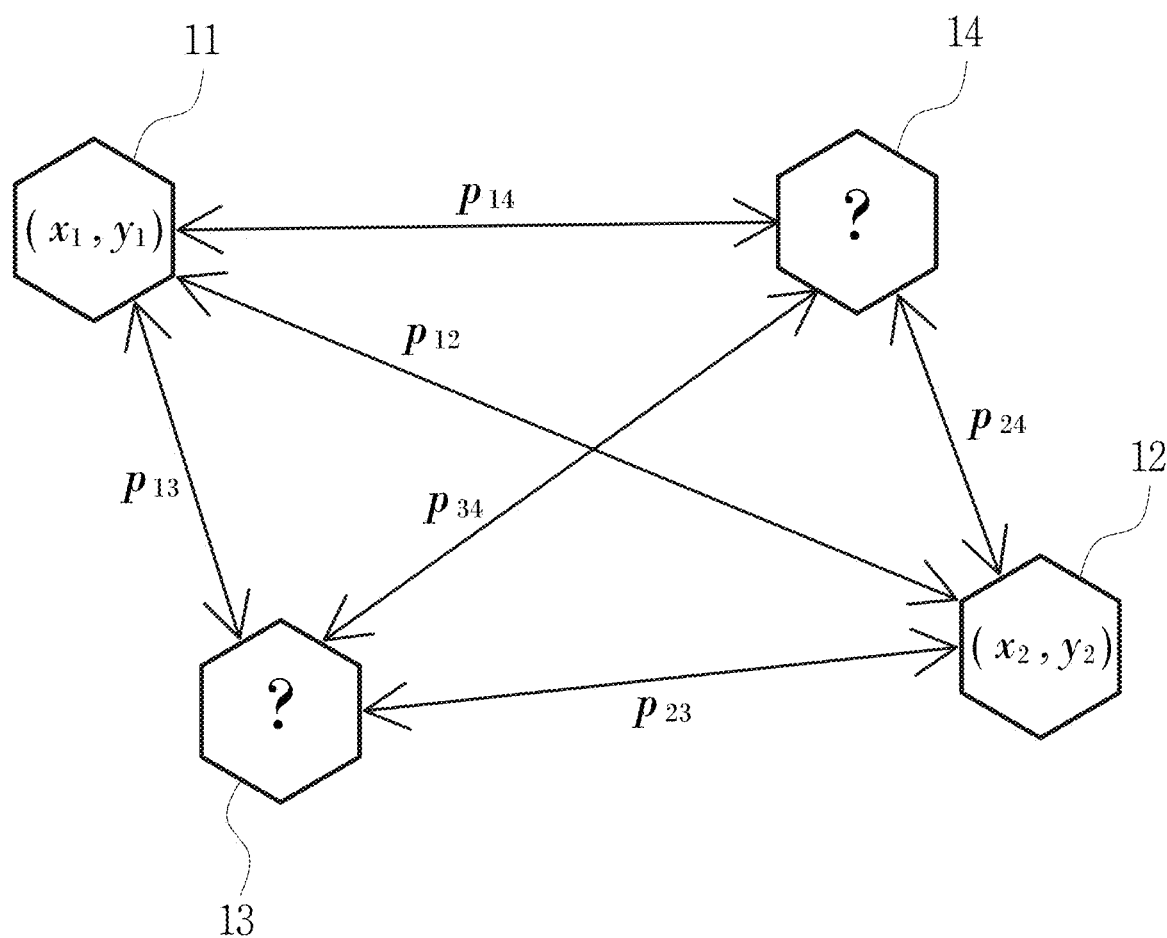
FIG. 3 is a diagram showing a fixed node and an unknown node.

FIG. 3 is a diagram showing a fixed node and an unknown node. Referring to FIG. 3, first to fourth nodes 11, 12, 13, 14 are shown, where the first and second nodes 11, 12 are fixed nodes, and the third and fourth nodes 13, 14 are unknown nodes. Location information of the first node is expressed as a coordinate ($x_1$, $y_1$), location information of the second node is expressed as a coordinate ($x_2$, $y_2$), and location information of the third and fourth nodes 13, 14 are not easily figured out.

Signals between the first to fourth nodes 11, 12, 13, 14 are depicted as p12, p13, p14, p23, p24 and p34.

p12 may be applied in the deriving an RSS signal model between fixed nodes (S13), and p13, p14, p23, p24 and p34 may be applied in the deriving an RSS signal model between nodes including an unknown node (S15).

Certainty information may be understood as the location information of the first and second nodes 11, 12, and uncertainty information may be understood as the location information of the third and fourth nodes 13, 14 and the measurement noise included in the RSS signal $p_{ij}$ p12, p13, p14, p23, p24 and p34.

Figure 4A:
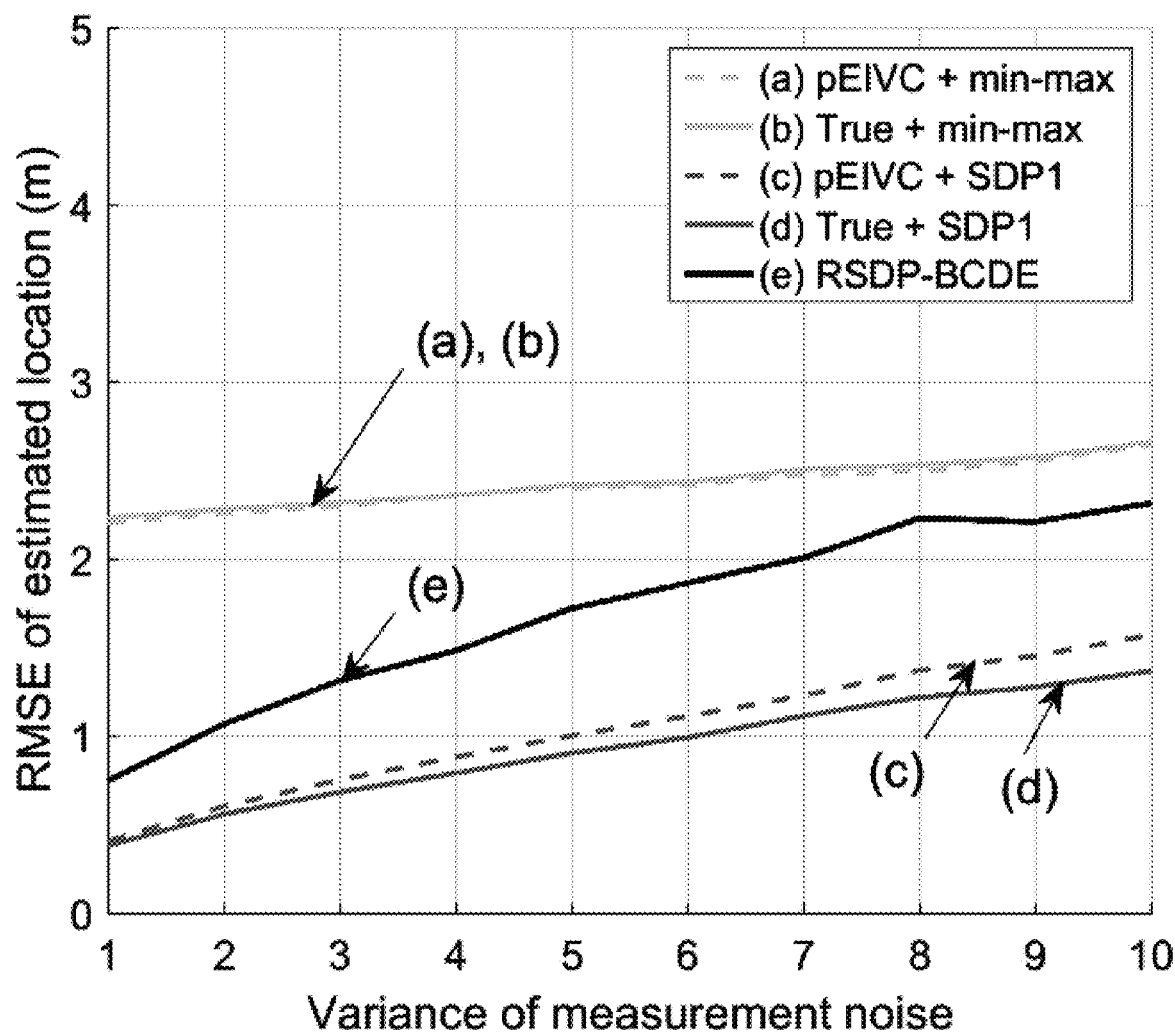
FIG. 4A is an RSS signal correction simulation graph based on a Partial EIV model showing an RMSE (Root Mean Square Error) of a measured location compared to a variance value of a measurement noise.
Figure 4B:
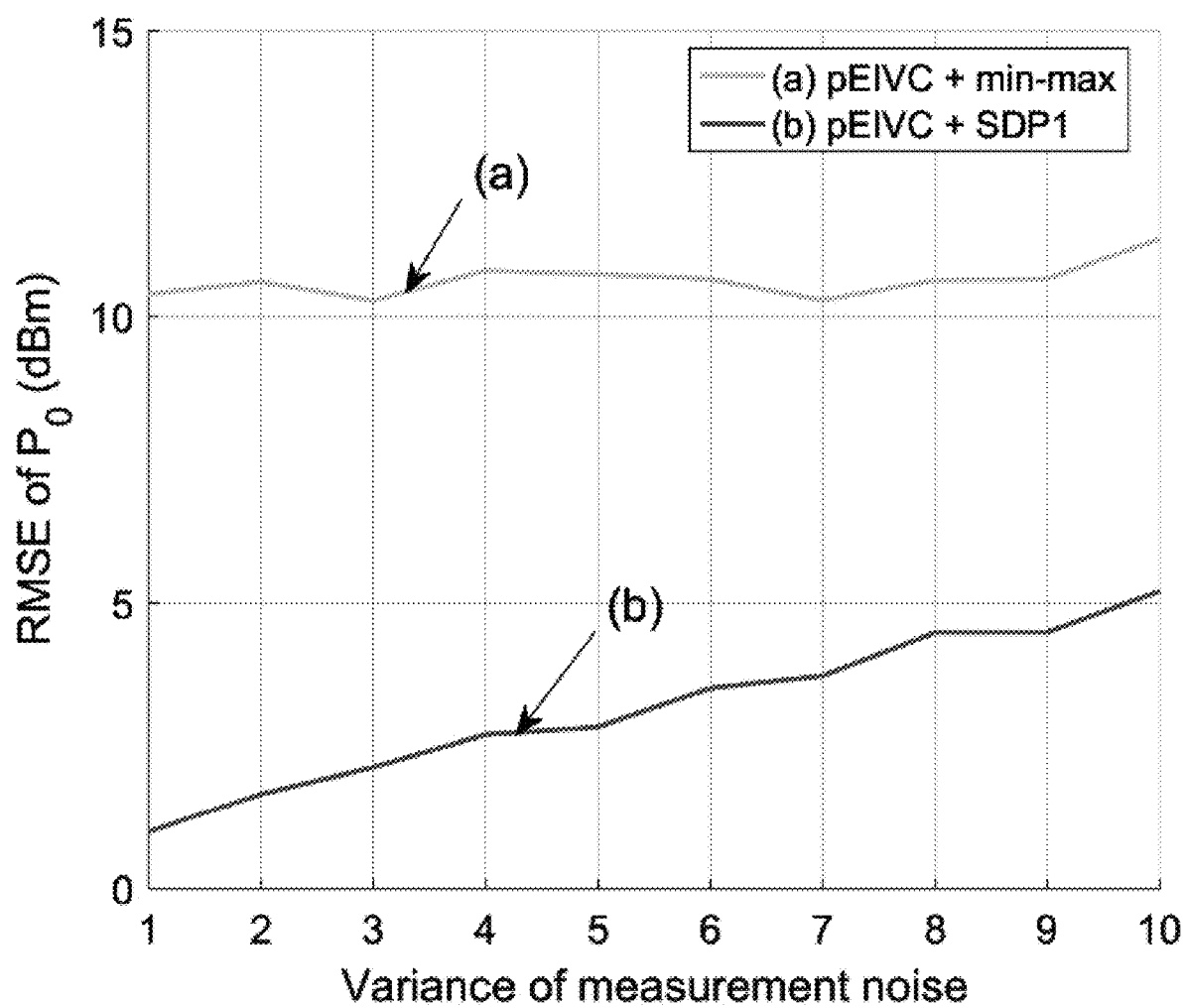
FIG. 4B is an RSS signal correction simulation graph based on a Partial EIV model showing an RMSE of $P_0$ (a path loss) compared to a variance value of the measurement noise.

FIG. 4A is an RSS signal correction simulation graph based on a Partial EIV model showing an RMSE (Root Mean Square Error) of a measured location compared to a variance value of a measurement noise, and FIG. 4B is an RSS signal correction simulation graph based on a Partial EIV model showing an RMSE of $P_0$ (a path loss) compared to a variance value of the measurement noise. Also, FIG. 4C is an RSS signal correction simulation graph based on a Partial EIV model showing an RMSE of $\gamma$ (a path loss exponent) compared to a variance value of the measurement noise.

The RSS signal correction method of the present disclosure may be easily combined with an existing RSS signal-based location estimation method, and as can be seen from FIG. 4A, shows almost the same location error performance as the location tracking method to which actual parameters are applied.

Figure 5A:
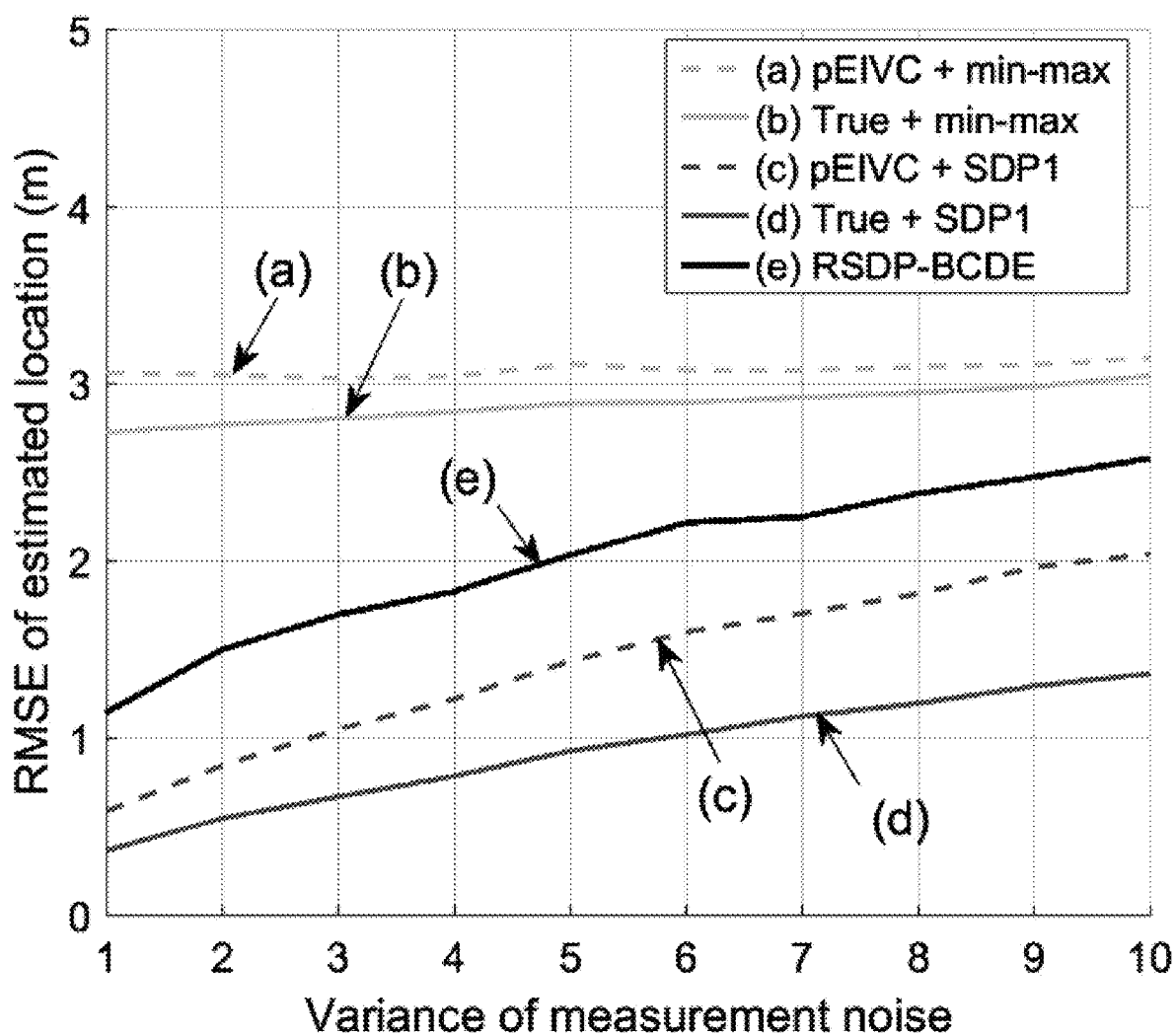
FIG. 5A is an RSS signal correction simulation graph based on a Partial EIV model showing an RMSE of a measured location compared to a variance value of the measurement noise.
Figure 5B:
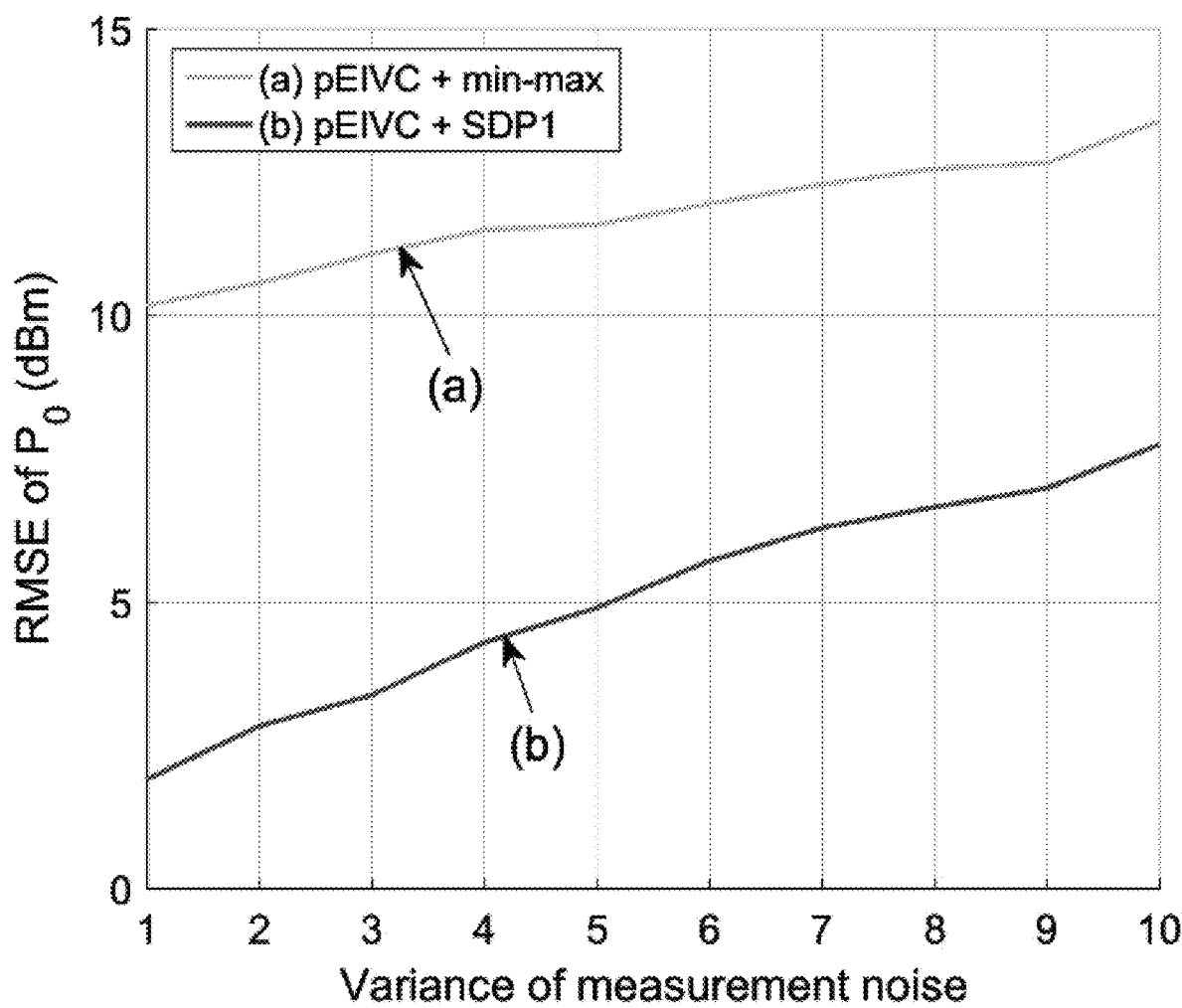
FIG. 5B is an RSS signal correction simulation graph based on a Partial EIV model showing an RMSE of $P_0$ (a path loss) compared to a variance value of the measurement noise.

FIG. 5A is an RSS signal correction simulation graph based on a Partial EIV model showing an RMSE of a measured location compared to a variance value of the measurement noise, and FIG. 5B is an RSS signal correction simulation graph based on a Partial EIV model showing an RMSE of $P_0$ (a path loss) compared to a variance value of the measurement noise. Also, FIG. 5C is an RSS signal correction simulation graph based on a Partial EIV model showing an RMSE of $\gamma$ (a path loss exponent) compared to a variance value of the measurement noise.

Figure 4C:
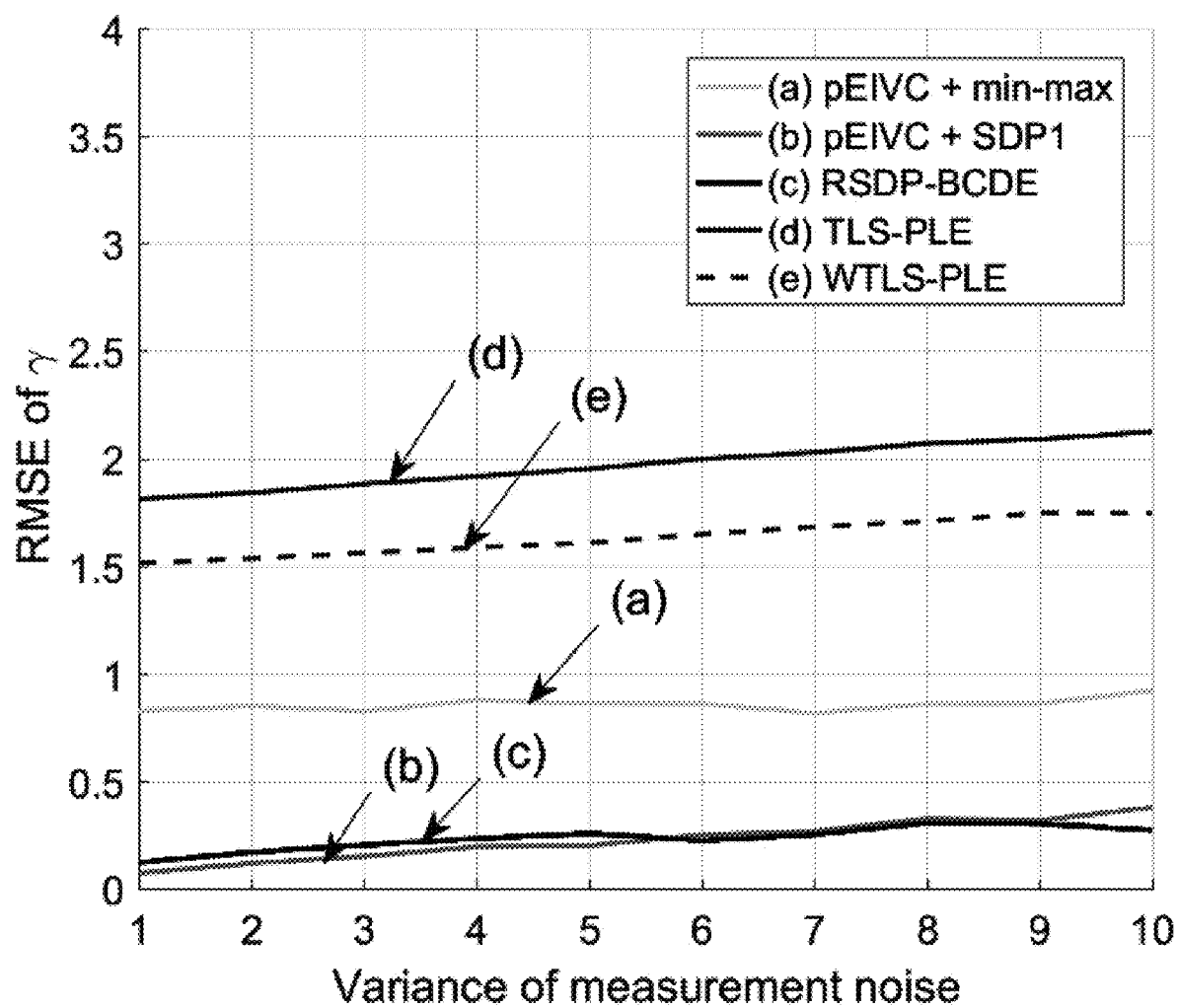
FIG. 4C is an RSS signal correction simulation graph based on a Partial EIV model showing an RMSE of $\gamma$ (a path loss exponent) compared to a variance value of the measurement noise.
Figure 5C:
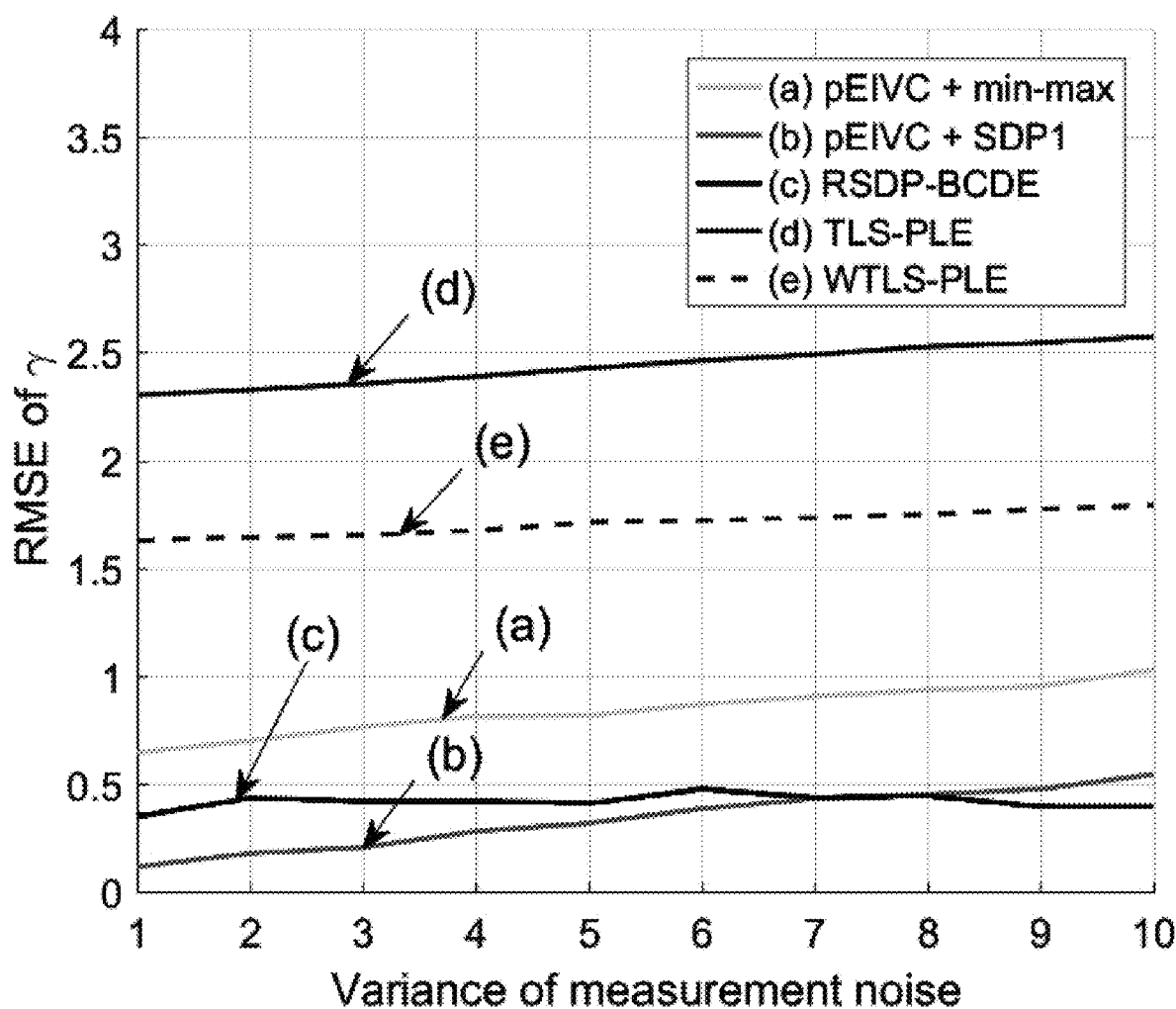
FIG. 5C is an RSS signal correction simulation graph based on a Partial EIV model showing an RMSE of $\gamma$ (a path loss exponent) compared to a variance value of the measurement noise.

The result of FIGS. 5A to 5C is the result when anchor nodes are differently arranged in the same environment as FIGS. 4A to 4C.

Figure 6A:
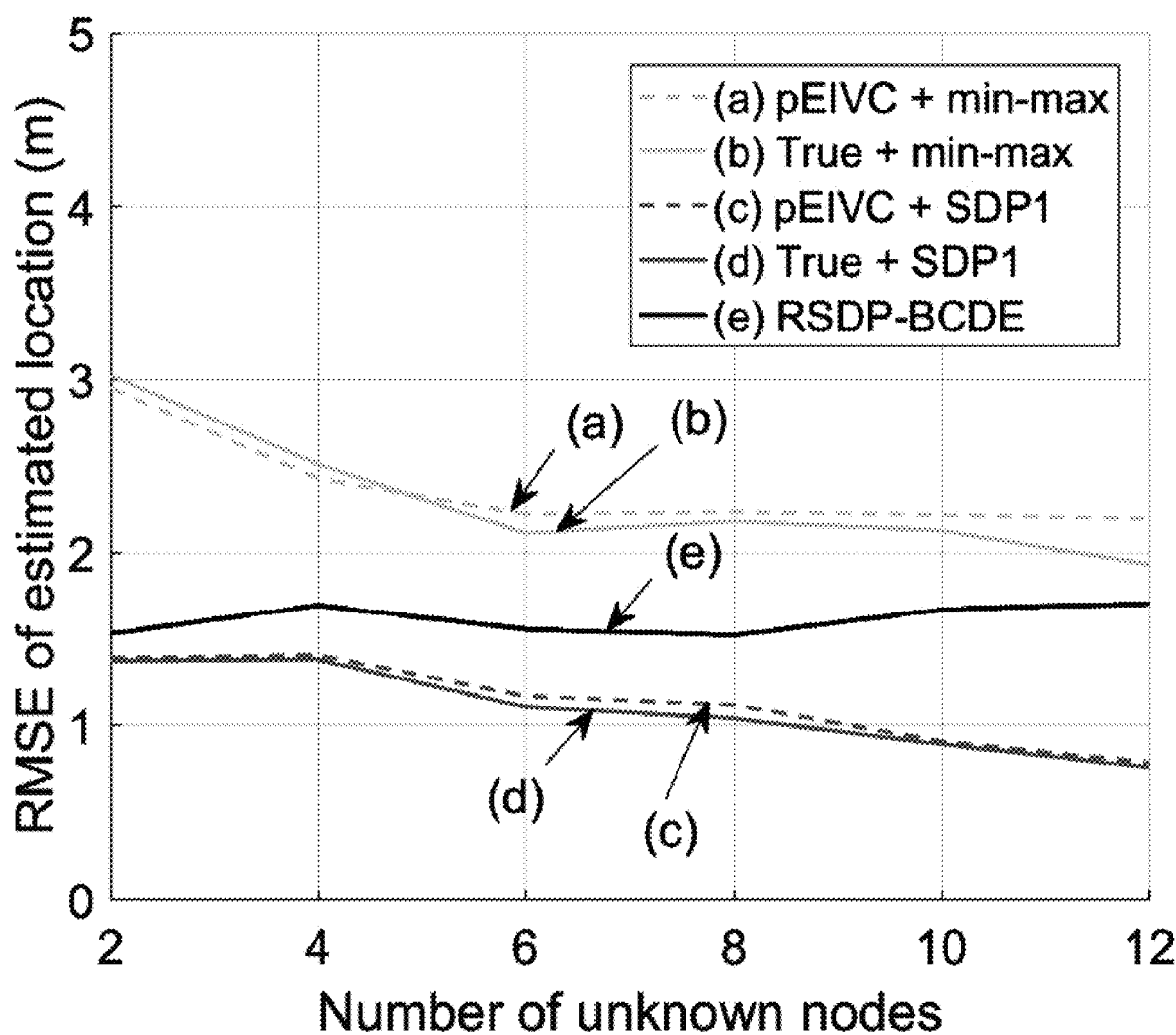
FIG. 6A is an RSS signal correction simulation graph based on a Partial EIV model showing an RMSE of a measured location compared to the number of unknown nodes.
Figure 6B:
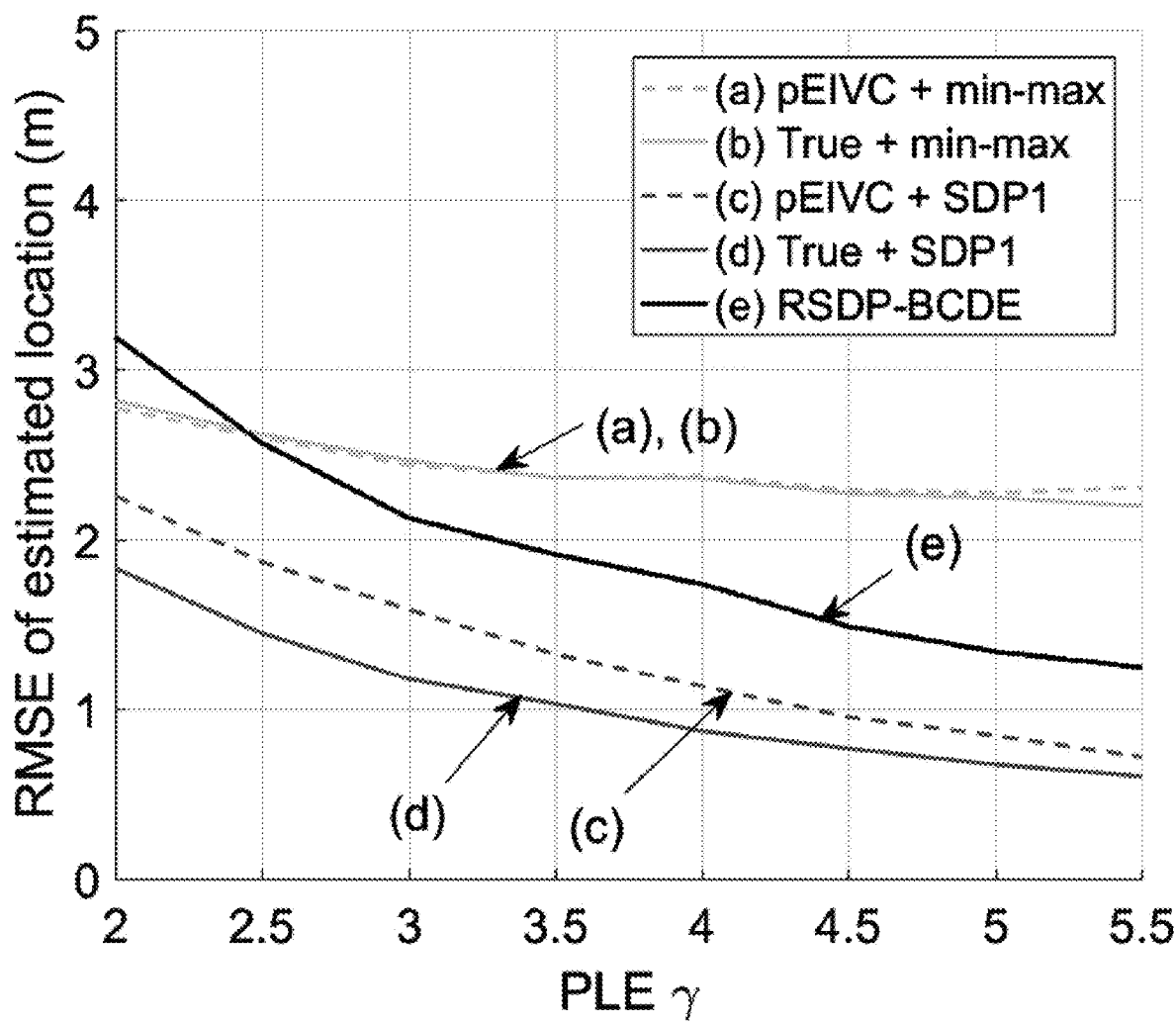
FIG. 6B is an RSS signal correction simulation graph based on a Partial EIV model showing an RMSE of a measured location compared to $\gamma$ (a path loss exponent).

FIG. 6A is an RSS signal correction simulation graph based on a Partial EIV model showing an RMSE of a measured location compared to the number of unknown nodes, and FIG. 6B is an RSS signal correction simulation graph based on a Partial EIV model showing an RMSE of a measured location compared to $\gamma$ (a path loss exponent).

In FIGS. 6A and 6B, it may be found that as the number of unknown nodes increases and the value of $\gamma$ increases, the location error performance is close to that of the location tracking method to which actual parameters are applied.

Figure 7A:
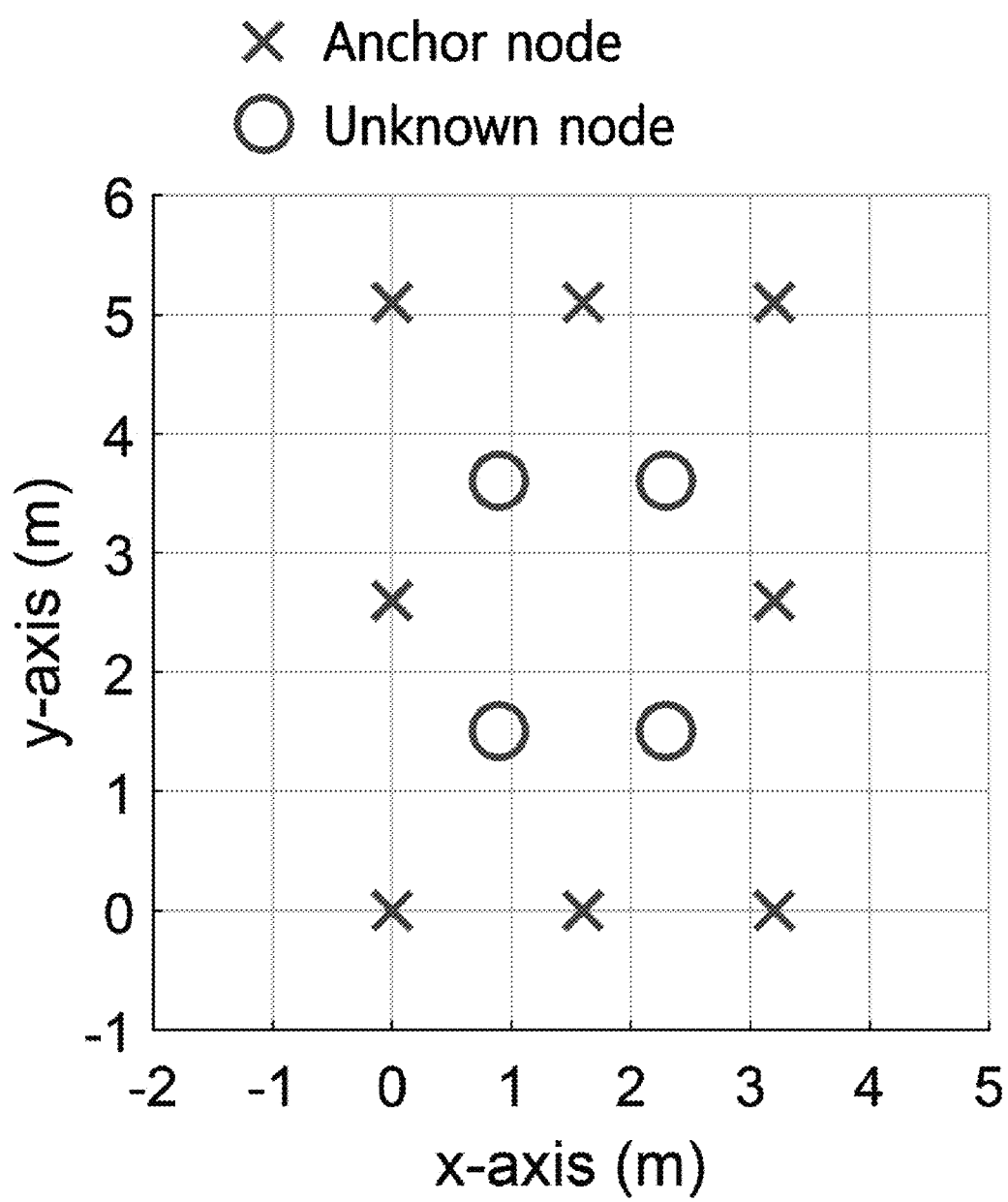
FIG. 7A is a graph showing an arrangement of a fixed node and an unknown node.
Figure 7B:
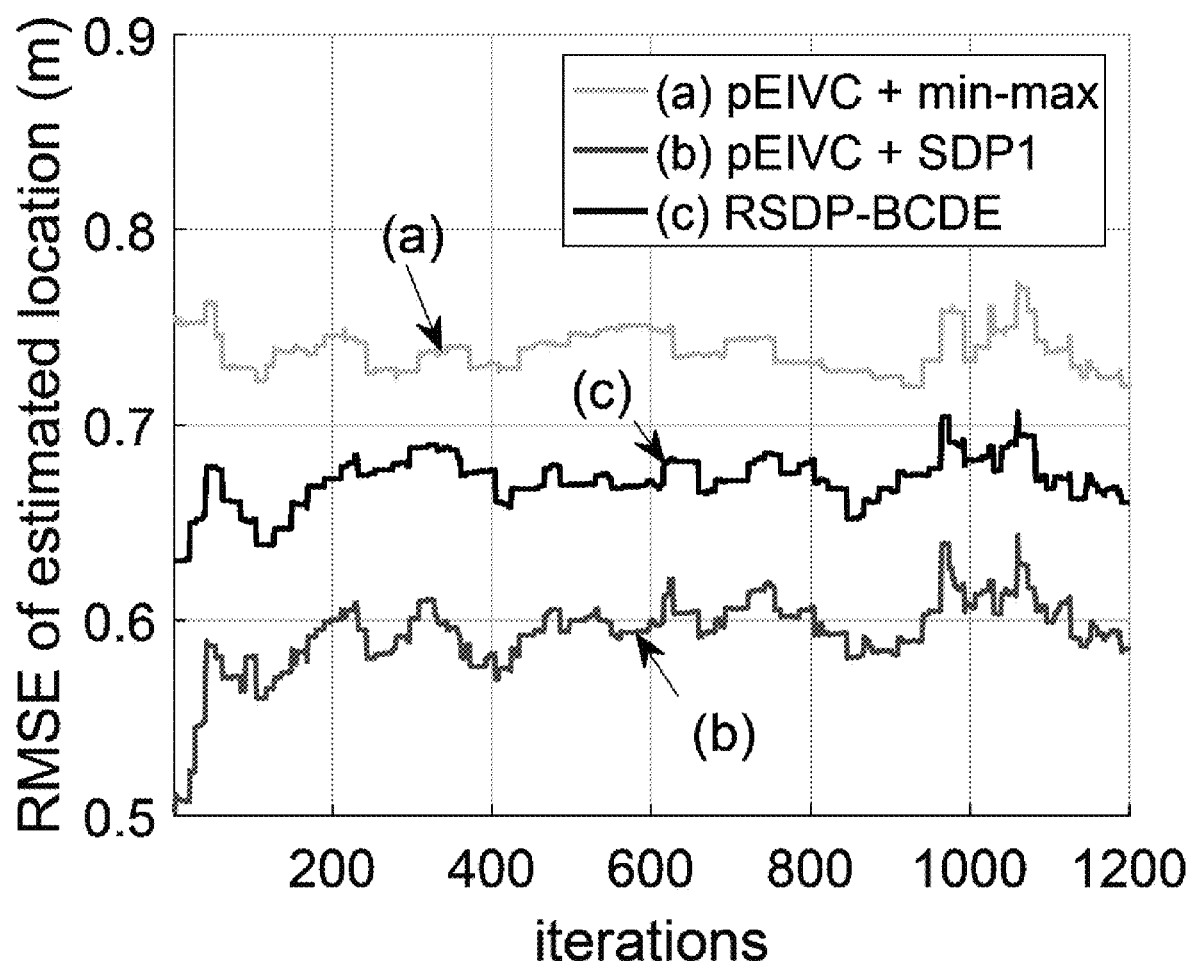
FIG. 7B is a graph showing an RMSE of a measured location according to a repetition frequency.

FIG. 7A is a graph showing an arrangement of a fixed node and an unknown node, and FIG. 7B is a graph showing an RMSE of a measured location according to a repetition frequency.

In FIG. 7B, it may be found that the actual experimental result shows the same trend as the simulation result.

The RSS signal correction method (S100) of the present disclosure may minimize an error caused by RSS signal noise and obtain a distance model with higher accuracy by estimating a variable in the RSS signal model based on at least one of location information of a fixed node, location information of an unknown node and measurement noise information of the unknown node.

Since the RSS signal correction method (S100) of the present disclosure estimates a distance model in real time, a more accurate distance model may be obtained for the change of a surrounding environment.

The present disclosure may obtain a more accurate distance model by utilizing RSS signal and distance information between a fixed node and a fixed node, between a fixed node and an unknown node, and between an unknown node and an unknown node.

The RSS signal correction method (S100) of the present disclosure may be applied to an existing RSS signal-based service to minimize a location error and improve position estimation performance.

The RSS signal correction method (S100) of the present disclosure may be applied to parking confirmation service and indoor location service.

The RSS signal correction method (S100) as described above is not limited to the configuration and method of the embodiments described above, but the embodiments may be modified in various ways by combining the embodiments entirely or selectively.

It will be apparent to those skilled in the art that the present disclosure can be embodied in other specific forms without departing from the essential characteristics of the present disclosure. Accordingly, the above detailed description should be considered in all respects as illustrative and not restrictive. The scope of the present disclosure shall be determined by rational interpretation of the appended claims, and all changes within the equivalence scope of the present disclosure shall fall within the scope of the present disclosure.

What is claimed is:

1. A Received Signal Srength (RSS) signal correction method for performing location measurement by utilizing information among a plurality of nodes, the RSS signal correction method comprising:
   estimating a variable of an RSS signal model based on at least one of location information of a fixed node, location information of an unknown node and measurement noise information of the unknown node:
   deriving the RSS signal model based on at least one of the location information of the fixed node, the location information of the unknown node and the measurement noise information of the unknown node;
   vectorizing the derived RSS signal model; and
   calculating an RSS signal model parameter by deriving a Partial EIV (Errors-in-Variables) model from the vectorized RSS signal model,
   wherein the parameter includes a path loss at a reference distance and a path loss exponent that is a ratio of an RSS silo reduced as a distance between nodes increases.

2. The RSS signal correction method according to claim 1,
   wherein the deriving the RSS signal model includes:
   deriving an RSS signal model between fixed nodes, calculated by the following [Equation 1]; and
   deriving an RSS signal model between nodes including the unknown node, calculated by the following [Equation 2], [Equation 1]

$$P_{ij} = P_0 - 10\gamma \log_{10}(d_{ij}/d_0) + \chi_{ij}$$

where $p_{ij}$ is an RSS signal between $i^{th}$ and $j^{th}$ fixed nodes among the fixed nodes, $P_0$ is a path loss at a distance $d_0$, $\gamma$ is a path loss exponent, which means a ratio of $p_{ij}$ reduced as a distance $d_{ij}$ increases, is a distance between the $i^{th}$ and $j^{th}$ nodes, $d_0$ is a reference distance, and $\chi_{ij}$ is a measurement noise of the RSS signal between the $i^{th}$ and $j^{th}$ nodes:

[Equation 2]

$$p_{ij} = P_0 - 10\gamma \log_{10}((\hat{d}_{ij} + \varepsilon_{ij})/d_0) + \chi_{ij}$$

where $p_{ij}$ is an RSS signal between the $i^{th}$ and $j^{th}$ nodes, $P_0$ is a path loss at the distance $d_0$, $\gamma$ is a path loss exponent, which means a ratio of $p_{ij}$ reduced as a distance $\hat{d}_{ij}$ increases $\hat{d}_{ij}$, is an estimated distance between the $i^{th}$ and $j^{th}$ nodes, $d_0$ is a reference distance, $\varepsilon_{ij}$ is a distance error between the $i^{th}$ and $j^{th}$ nodes, and $\chi_{ij}$ is a measurement noise of the RSS signal between the $i^{th}$ and $j^{th}$ nodes.

3. The RSS signal correction method according to claim 2, wherein in the deriving an RSS signal model between nodes including the unknown node, the [Equation 2] is transformed to the following [Equation 3] by Taylor series approximation:

$$p_{ij} = P_0 - 10\gamma \log_{10}\left(\frac{\hat{d}_{ij}}{d_0}\right) - \gamma \varepsilon_{ij} + \chi_{ij} \quad [\text{Equation 3}]$$

where $p_{ij}$ is an RSS signal between the $i^{th}$ and $j^{th}$ nodes, $P_0$ is a path loss at the distance $d_0$, $\gamma$ is a path loss exponent, which means a ratio of $p_{ij}$ reduced as a distance $\hat{d}_{ij}$ increases, $\hat{d}_{ij}$ is an estimated distance between the $i^{th}$ and $j^{th}$ nodes, $d_0$ is a reference distance, $\varepsilon_{ij}$ is a distance error between the $i^{th}$ and $j^{th}$ nodes, and $\chi_{ij}$ is a measurement noise of the RSS signal between the $i^{th}$ and $j^{th}$ nodes.

4. The RSS signal correction method according to claim 2, wherein the vectorizing is performed by the following [Equation 4]:

$$\begin{bmatrix} p_T \\ p_F \end{bmatrix} = \left( \begin{bmatrix} 1_{vec} & d_T \\ 1_{vec} & \hat{d}_F \end{bmatrix} - \begin{bmatrix} 0_{vec} & 0_{vec} \\ 0_{vec} & \varepsilon_F \end{bmatrix} \right) x + \begin{bmatrix} \chi_T \\ \chi_F \end{bmatrix} \quad [\text{Equation 4}]$$

where $x = [P_0, \gamma]^T$, $P_T$ is a row vector made by an RSS signal model between fixed nodes calculable by [Equation 1], $P_F$ is a row vector made by an RSS signal model between nodes including an unknown node calculable by [Equation 2], $P_T$, $\chi_T$, and $d_T$ are values related to the RSS signal model between the fixed nodes, which are row vectors respectively having $p_{ij}$, $\chi_{ij}$ and $-10 \log_{10}(d_{ij}/d_0)$ as at least one matrix element, and $\varepsilon_{ij} p_F$, $\chi_F$ and $\hat{d}$ F are values related to the RSS signal model between the nodes including the unknown node, which are row vectors respectively having $\varepsilon_{ij} p_F$, $\chi_{ij}$, and $-10 \log_{10}(\hat{d}/d_0)$ as at least one matrix element:

$$p_T = \begin{bmatrix} \vdots \\ p_{ij} \\ \vdots \end{bmatrix}, \chi_T = \begin{bmatrix} \vdots \\ \chi_{ij} \\ \vdots \end{bmatrix}, \varepsilon_F = \begin{bmatrix} \vdots \\ \varepsilon_{ij} \\ \vdots \end{bmatrix}, p_F = \begin{bmatrix} \vdots \\ p_{ij} \\ \vdots \end{bmatrix},$$

$$\chi_F = \begin{bmatrix} \vdots \\ \chi_{ij} \\ \vdots \end{bmatrix}, d_T = \begin{bmatrix} \vdots \\ -10\log_{10}\left(\frac{d_{ij}}{d_0}\right) \\ \vdots \end{bmatrix},$$

$$\hat{d}_F = \begin{bmatrix} \vdots \\ -10\log_{10}\left(\frac{\hat{d}_{ij}}{d_0}\right) \\ \vdots \end{bmatrix}$$

where $0_{vec}$ a row vector in which all elements are 0, and $1_{vec}$ is a row vector in which all elements are 1.

5. The RSS signal correction method according to claim 4, wherein the calculating an RSS signal model parameter by deriving a Partial EIV model from the vectorized RSS signal model is performed by the following [Equation 5] and the following [Equation 6]:

$$p - \chi = (x^T \otimes I)(d_{T,aug} + I_{aug} d_F) \quad [\text{Equation 5}]$$

where $p = [p_T^T \; p_F^T]^T$, $\chi = [\chi_T^T \; \chi_F^T]^T$, $$d_{T,aug} = \begin{bmatrix} 1_{vec} \\ 1_{vec} \\ d_T \\ 0_{vec} \end{bmatrix}, I_{aug} = \begin{bmatrix} 0_{mat} \\ 0_{mat} \\ 0_{mat} \\ I \end{bmatrix},$$

$0_{vec}$ is a row vector in which all elements are 0, $1_{vec}$, is a row vector in which all elements are 1, $0_{mat}$ is a row vector in which all elements are 0, and $d_F$ is an actual distance value obtained by subtracting the distance error from $\hat{d}$ F that is a value based on the estimated distance,

[Equation 6]

$$\hat{d}_F = d_F + \varepsilon_F$$

where $\hat{d}$ F is a row vector in which $\hat{d}_{ij}$ that is an estimated distance between the $i^{th}$ and $j^{th}$ nodes is a matrix element, $\varepsilon_F$ is a row vector in which a distance error $\varepsilon_{ij}$ between the $i^{th}$ and $j^{th}$ nodes is a matrix element, and $d_F$ is an actual distance value obtained by subtracting the distance error from $\hat{d}$ F that is a value based on the estimated distance.

6. The RSS signal correction method according to claim 5, before the deriving an RSS signal model, further comprising:

inputting an initial path loss and an initial path loss exponent; and estimating a location of the unknown node based on a path loss and a path loss exponent before the initial path loss and the initial path loss exponent, wherein the deriving an RSS signal model, the vectorizing the derived RSS signal model and the calculating an RSS signal model parameter are performed based on the initial path loss, the initial path loss exponent and the previous location of the unknown node.

7. The RSS signal correction method according to claim 6, wherein the estimating a location of the unknown node, the deriving an RSS signal model, the vectorizing the derived RSS signal model and the calculating an RSS signal model parameter are performed iteratively to improve accuracy in estimating a variable of the RSS signal model.

* * * * *